United States Patent [19]

Bernhard

[11] 4,323,554
[45] Apr. 6, 1982

[54] PREPARATION AND USE OF IMPROVED PEARLESCENT PIGMENTS OF HIGH LIGHT FASTNESS

[75] Inventor: Horst Bernhard, Reinheim, Fed. Rep. of Germany

[73] Assignee: Merck Patent Gesellschaft mit beschränkter Haftung, Darmstadt, Fed. Rep. of Germany

[21] Appl. No.: 167,598

[22] Filed: Jul. 11, 1980

[30] Foreign Application Priority Data

Jul. 13, 1979 [DE] Fed. Rep. of Germany ....... 2928287

[51] Int. Cl.³ .................. A61K 7/021; C09C 1/00; C09C 3/08; C09C 3/10
[52] U.S. Cl. ..................... 424/63; 106/291; 424/64; 424/69; 427/118; 427/220; 428/363; 428/403
[58] Field of Search .............. 106/291, 308 B; 427/118, 220; 428/324, 363, 403; 424/63, 64, 69

[56] References Cited

U.S. PATENT DOCUMENTS

| | | | |
|---|---|---|---|
| 3,647,492 | 3/1972 | Chapman | 106/291 |
| 3,656,982 | 4/1972 | Chapman | 106/291 |
| 3,711,308 | 1/1973 | Brand | 106/291 |
| 3,874,890 | 4/1975 | Bernhard | 106/291 |
| 3,897,586 | 7/1975 | Coker | 428/403 |
| 3,926,659 | 12/1975 | Bernhard | 106/291 |
| 3,951,679 | 4/1976 | Bernhard | 106/291 |
| 4,017,326 | 4/1977 | Davis | 106/291 |
| 4,040,859 | 8/1977 | Esselborn | 106/291 |
| 4,084,983 | 4/1978 | Bernhard | 106/289 |
| 4,116,628 | 9/1978 | Hesse | 106/291 X |
| 4,205,997 | 6/1980 | Hesse | 106/291 X |
| 4,236,934 | 12/1980 | Bell | 106/291 X |

Primary Examiner—Dennis L. Albrecht
Attorney, Agent, or Firm—Millen & White

[57] ABSTRACT

Colored material-containing pearlescent pigments based on mica flakes coated with metal oxide contain as colored material, a colored aluminum lake which is fixed as a water-insoluble compound on the surface of the pigment particles, the lake being formed from a precipitated aluminum hydroxide layer, wherein the aluminum hydroxide layer forming the colored lake contains 1 to 50% by weight of a compound of the formula

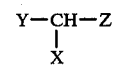

wherein X is hydroxy or carboxy, Y is hydrogen or alkyl or alkenyl of 10 to 20 carbon atoms and Z is hydrogen, or alkyl or alkenyl of 10 to 20 carbon atoms, or the grouping

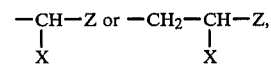

said compound having a molecular weight of at least 150 and a solubility in water at a pH of 5-9 of at least 0.05 g/l, and said compound being precipitated onto the flakes together with the aluminum hydroxide layer. A process for the production of these pigments is also provided, as are cosmetics containing them.

9 Claims, No Drawings

PREPARATION AND USE OF IMPROVED PEARLESCENT PIGMENTS OF HIGH LIGHT FASTNESS

BACKGROUND OF THE INVENTION

The present invention concerns dyestuff-containing pearlescent pigments based on mica flakes coated with metal oxides wherein the dyestuffs are colored aluminum lakes.

Pearlescent pigments of this kind are used in a large variety of fields, for example in cosmetics or as additives to synthetic resins, lacquers and dyestuffs. They are known, for example, from published Federal Republic of Germany patent specification No. 2,429,762 equivalent to U.S. Pat. No. 4,084,983. For the production of its pigments, an aluminum hydroxide layer is first applied to mica flakes coated with metal oxides by the precipitation from an aluminum salt solution. Then, by reaction of the so-coated pigments with hydroxy-containing compounds, water-insoluble colored aluminum lakes are formed as firmly adhering colored materials. These are formed either directly or with the intermediate formation of a sparingly soluble aluminum chelate and a subsequent reaction thereof with a diazotized amine.

These pearlescent pigments can also be produced in a manner analogous to that described in Federal Republic of Germany patent specification No. 1,192,353 in which precipitation of the aluminum hydroxide layer and reaction with a hydroxy-containing compound take place simultaneously so that either the colored lake or the aluminum chelate to be reacted to give the colored lake is fixed directly on to mica flakes coated with metal oxides.

For practically all fields of use of such pigments, their light fastness plays a very important part. In order to improve on their present usefulness and in order posssibly to widen their fields of use, the problem exists of making available colored pearlescent pigments with improved light fastness.

SUMMARY OF THE INVENTION

Accordingly, it is an object of this invention to provide such colored pearlescent pigments having improved light fastness.

Upon further study of the specification and appended claims, further objects and advantages of this invention will become apparent to those skilled in the art.

These objects have been achieved by this invention.

Surprisingly, it has been found that the presence of certain organic compounds during the precipitation of the aluminum hydroxide coating alone or of its precipitation while forming the aluminum chelate or the colored aluminum lake, effects a considerable improvement of the light fastness of the pigments. Organic compounds which are suitable for this purpose are characterized by at least one functional group which can form a more or less firm bond with aluminum hydroxide and which, therefore, are at least partly co-precipitated with the aluminum hydroxide on the mica flakes and are incorporated into the aluminum hydroxide layer to form a colored lake. Hydroxy and/or carboxy containing compounds are especially preferred for this purpose.

Thus, according to the present invention, there are provided colored material-containing pearlescent pigments comprising mica flakes coated with metal oxide wherein the colored material is a colored aluminum lake which is fixed as a water-insoluble compound on the surface of the pigment particles, the lake being formed from a precipitated aluminum hydroxide layer, wherein the aluminum hydroxide layer forming the colored lake contains 1-50% by weight of a compound of the formula I:

wherein X is hydroxy or carboxy; Y is hydrogen, or alkyl or alkenyl each of 10 to 20 carbon atoms; and Z is hydrogen, or alkyl or alkenyl each of 10 to 20 carbon atoms, or the grouping

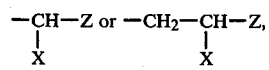

wherein X and Z are as defined above, this compound having a molecular weight of at least 150 and a solubility in water at a pH of 5-9 of at least 0.05 g/l (20° C.) up to complete miscibility, and the compound being precipitated together with the aluminum hydroxide layer.

Furthermore, the present invention provides a process for the production of colored material-containing pearlescent pigments by precipitating an aluminum hydroxide layer on mica flakes coated with metal oxide, and subsequently or simultaneously reacting the flakes with a solution of an hydroxy-containing compound which, directly or with the intermediate formation of a sparingly-soluble aluminum chelate and subsequent reaction thereof with a diazotized amine, is able to form a water-insoluble colored aluminum lake, wherein the precipitation of the aluminum hydroxide layer forming the colored lake takes place in the presence of such an amount of a compound of formula (I) that the compound is incorporated into the aluminum hydroxide layer in an amount of from 1-50% by weight, referred to $Al(OH)_3$.

The present invention also provides compositions suitable for use in body care, such as cosmetics, containing the colored pearlescent pigments of this invention.

DETAILED DISCUSSION

Colored material-containing pearlescent pigments are described in Federal Republic of Germany patent specification No. 2,429,762 and its equivalent, U.S. Pat. No. 4,084,983, whose disclosures in this regard are incorporated by reference herein. The criteria mentioned therein with regard to the choice of the starting materials, processes for coating with aluminum hydroxide and the formation of the colored materials apply in an analogous manner to the present invention. However, in comparison with these known pigments, the pigments of this invention possess, due to the incorporation of the mentioned organic compounds, the advantage of improved light fastness. Even the incorporation of relatively small amounts of compounds of formula (I) into the aluminum hydroxide layer forming the colored lake substantially improves the light fastness of the pigments obtained.

Herein, within the scope of the present invention, reference to an incorporation in the "aluminum hydroxide layer" is to be understood to refer to all the mentioned possibilities of the precipitated aluminum-containing layer which possibly also consists of aluminum chelates or colored aluminum lakes and, especially for the calculation of the weight proportions of the total aluminum content, the layer is calculated as $Al(OH)_3$.

A theoretical explanation for the improved light fastness cannot yet be given. However, it has been found that the added organic compound must possess at least one functional group which is able to form a more or less firm bond, for example, a coordinate bond, with aluminum hydroxide. Preferred functional groups are hydroxy and carboxy. Especially when the functional group is hydroxy which is bound only relatively weakly to aluminum hydroxide, it is advantageous that several such functional groups be present in the same molecule, Sorbitol is an example of such a compound.

The compounds of formula (I) can be monomeric such as the above-mentioned sorbitol, or such as, for example, oleic acid, stearic acid, palmitic acid or linolic acid. However, they can also be polymeric compounds, such as, for example, polyvinyl alcohol or polyacrylic acid.

Particularly in the case of polymeric compounds, formula (I) cannot always provide an absolutely exact description since variations in the chain length and the nature of the linking and of the chain end members can be present. Any such compounds not literally included because of such structural features are, of course, operational and functional equivalents of the compounds literally included in formula (I). Thus, for example, in the case of polyvinyl alcohol prepared by the hydrolysis of polyvinyl acetate, hydrolysis is, as a rule, not complete. Accordingly, instead of hydroxyl groups, acetoxy radicals can still be present. Although these radicals do not have a disturbing influence, it must be ensured that a sufficient number of hydrophilic hydroxyl groups are present so that, on the one hand, the solubility of the compound in the pigment suspension employed for the coating is sufficiently great and that, on the other hand, the bonding to the aluminum hydroxide is sufficiently strong so that a coprecipitation with the aluminum hydroxide or the aluminum chelate or the colored aluminum lake takes place. In the case of polyvinyl alcohol, these conditions are fulfilled when the polyvinyl acetate starting material is saponified to an extent of at least about 70%.

Suitable alkyl groups for Y or Z, independently, include branched or straight-chain alkyl groups of 10–20 carbon atoms, for example, including, decyl, undecyl, dodecyl, 2-methyl-dodecyl, octadecyl, eicosanyl, etc. Similarly, suitable alkenyl groups for Y or Z include straight-chain or branched alkenyl groups of 10–20 carbon atoms, including, for example, dec-2-en-1-yl, dec-3-en-5-yl, undecenyl, tetradecenyl, octadecenyl, eicosenyl, etc.

For the firm fixing of the coprecipitated compound in the aluminum hydroxide, it is advantageous that the molecular weight of the compound of formula (I) not be too small. Compounds with a molecular weight above about 150, e.g., 150–150 000, have proven to be useful. In the case of high molecular weights and especially in the case of polymeric compounds, it is, of course, necessary to ensure, as already mentioned, that, by means of the presence of a sufficient number of hydroxy and/or carboxy groups, there is not only the required water solubility, but also an effective incorporation into the aluminum hydroxide layer of the compound.

It has already been mentioned that, even with very small amounts of such compounds, for example, about 1% by weight, referred to the amount of aluminum hydroxide, a substantial improvement of the light fastness of the pigments is achieved. As a rule, the light fastness does not increase proportionally with the content of the compounds of formula (I), but rather, even in some cases with very high contents, becomes worse than in the case of a pigment without the addition of such a compound. Thus, there is an optimum content for a compound of formula (I) in the aluminum hydroxide layer. More than 50% by weight should not be present. The optimum content can differ from one compound to another but, for each individual compound, can easily be ascertained experimentally, values of from about 3, e.g., about 5 to about 30% by weight usually being found, e.g., 3–20% of polyvinyl alcohol is especially preferred.

Whether the optimum content, which is not sharply limited but rather displays a considerable spread, has a relatively high value or a low value, also depends upon the number of functional groups present in a molecular weight unit of a compound of formula (I). Thus, it has been found that the number of functional groups which are incorporated with compounds of formula (I) into the aluminum hydroxide layer, possesses an optimum ratio to the number of molecules of aluminum hydroxide which is about 1:10 to 1:2, so that one out of two to one out of ten molecules of aluminum hydroxide is coordinated by a functional group. For a compound of formula (I) with a molecular weight of, for example, 250, and which contains only one functional group within the meaning of the present invention, relatively large amounts by weight must thus be incorporated in order to obtain the prescribed preferred number of functional groups in the aluminum hydroxide layer. In the case of a compound of formula (I) which has a molecular weight of, for example, 10,000 and contains, for example, 250 functional groups, i.e., one functional group for a molecular weight proportion of 40, a smaller amount by weight suffices in order to provide the same number of functional groups in the aluminum hydroxide layer.

On the basis of these statements, one of ordinary skill in the art will readily be able to select, in addition to the above-mentioned compounds, other equally effective compounds and to use these in an appropriate amount by weight. In any case, however, merely a few routine experiments suffice in order to find the particular optimum amount.

As starting materials for the production of the new pigments of this invention, use can be made of all known pigments based on mica flakes. Thus, there can be used not only mica flakes themselves but also those which are coated with uniform metal oxide layers. As a rule, the mica flakes have a diameter of from about 5 to 200 $\mu$m and a thickness of from 0.1 to 5 $\mu$m, and preferably about 0.5 $\mu$m. As metal oxide coatings, there are mainly used, because of their advantageous refractive index, titanium dioxide or titanium dioxide aquate and/or zirconium dioxide or zirconium dioxide aquate. However, pearlescent pigments can also be used which are coated with other metal oxides, for example, tin dioxide or iron oxide, or those which are coated with several metal oxides. Additional metal oxides can be present in the form of discrete layers or as additives of colored or non-colored metal oxides, for example, of iron, nickel, cobalt, chromium, vanadium, aluminum or antimony.

An especially frequently employed pigment is, for example, a mica flake pigment in which mica flakes with a diameter of from about 5 to 50 μm and a thickness of about 0.5 μm are uniformly coated with an optionally hydrated titanium dioxide layer, the mica flake surface having a titanium dioxide layer of from about 50 to 500 mg $TiO_2/m^2$. These known pearlescent pigments possess various interference colors, depending upon the layer thickness of the precipitated metal oxide layer. As a rule, they are calcined products. All these pigments are known and described, for example, in Federal Republic of Germany patent specification Nos. 1,467,468; 1,959,998 (U.S. Pat. No. 3,711,308) and 2,009,566 and in published Federal Republic of Germany Patent Application Nos. 22 44 298 (U.S. Pat. No. 3,874,890); 2,313,331 (U.S. Pat. No. 3,926,659); 2,313,332 (U.S. Pat. No. 3,951,679); 25 22 572 (U.S. Pat. No. 4,086,100) and 2,522,573 (U.S. Pat. No. 4,040,859), the disclosures of which are incorporated by reference herein.

These starting materials are coated with aluminum hydroxide in known manner by suspending the pigment particles in water and preferably heating the suspension to a temperature of, for example, from 40° to 95° C. An aqueous, acidic solution of water-soluble aluminum salt, for example, aluminum chloride, aluminum, nitrate, potassium aluminum sulphate or aluminum sulphate, or an aqueous, alkaline solution of an aluminate, for example, sodium aluminate or potassium aluminate, is then allowed to flow into the suspension. The concentration of aluminum ions in the inflowing salt solution is from 0.1 to 5 mole/l. Alkali or acid is simultaneously added thereto in order to adjust the pH to a value of from 3 to 10 and preferably of from 4 to 9. The alkali used is preferably an alkali metal or ammonium hydroxide, an aqueous sodium hydroxide solution or gaseous ammonia, the latter being especially preferred. When an acid is added, hydrochloric acid, sulphuric acid or nitric acid is preferred.

The addition of alkali or acid is thereby so regulated that the pH value of the suspension remains as constant as possible during the precipitation. It has proven to be desirable to adjust the precipitated amount of aluminum hydroxide to from about 0.1 to 20% by weight of $Al_2O_3$ in the finished pigment and preferably to from about 1 to 10% by weight. This corresponds to a thickness of the aluminum oxide or hydroxide layer of from about 1 to 100 nm.

If, simultaneously with the coating with aluminum hydroxide, the formation of the colored aluminum lake or of the aluminum chelate is to take plce, then either (a) simultaneously there is also dosed in, the solution of an hydroxyl group-containing compound which is able to form a water-insoluble colored aluminum lake directly, or which forms a lake indirectly with the intermediate formation of a sparingly-soluble aluminum chelate and subsequent reaction thereof with a diazotized amine, or (b) such a solution is present in the pigment suspension.

The incorporation, according to the present invention, of compounds of formula (I) takes place during this conventional coating procedure. For this purpose, the suspension of the starting pigment particles is mixed with an aqueous solution of a compound of formula (I) or such a solution is dosed in during the coating procedure when the aluminum hydroxide layer is to be precipitated. If the aluminum salt solution is dosed into this suspension, whereby there is formed either aluminum hydroxide or an aluminum chelate or a colored aluminum lake, which is precipitated onto the starting pigments, the compound of formula (I) dissolved in the suspension is bound to the aluminum hydroxide and co-precipitated, i.e., under any conditions, the compound of formula (I) must be co-precipitated at the time that the aluminum hydroxide precipitates.

From the amount of aluminum salt used for the coating, there can easily be calculated, on the basis of the above-stated criteria, the necessary amount of compound of formula (I) which must be added to the pigment suspension. In such procedures, account must be taken of the fact that the total amount of these compounds dissolved in the pigment suspension is not co-precipitated by the aluminum hydroxide in every case. Especially for those compounds which contain, as functional groups, only hydroxy groups and only enter into a relatively weak coordinate bond with aluminum hydroxide, a considerable amount of the total added can remain dissolved in the suspension. Thus, for example, polyvinyl alcohol is only co-precipitated to an extent of about 20-50% of the amount dissolved in the suspension. Moreover, it even happens that, with increasing polyvinyl alcohol concentration in the suspension, a saturation value is reached in the aluminum hydroxide layer beyond which no further polyvinyl alcohol is incorporated. Other compounds of formula (I) entering into stronger bonds with aluminum hydroxide, for example, polyacrylic acid, are co-precipitated to a large degree. However, in every case, by a routine preliminary experiment, there can easily be determined to what extent a particular compound of formula (I) is co-precipitated with aluminum hydroxide.

When, initially, only the precipitation of aluminum hydroxide or of an aluminum chelate has taken place, the so-coated pigments are then, after isolation and drying or also directly, further reacted for the formation of the colored aluminum lake. This coloring can take place in known manner, for example, in the manner described in detail in published Federal Republic of Germany patent specification No. 2,429,762 (U.S. Pat. No. 4,084,983). All processes and materials disclosed and used therein can be used in an analogous manner for the production of the pigments of this invention.

The pigments of this invention can be used in the same way as the previously known pigments, for example, as additives to synthetic resins, dyestuffs and lacquers but also especially in cosmetics. As a rule, the new pearlescent pigments are added in amounts of from 0.1 to 80% by weight. Usual forms of compositions include, for example, powders, salves and grease pencils, such as eyelid shadow pencils, eyelid shadow powder compacts, liquid compositions for eyelid shadow and eyelid liners, lipsticks, lip gloss creams for pencilling on, make-up in pencil form, make-up powder compacts, make-up emulsions, make-up fatty gels, light protection emulsions and tanning emulsions, foam bath concentrates with color gloss and lotions for the care of the skin.

Besides the outstanding color gloss, the pigments of this invention are especially characterized by an improved light fastness which effectively prevents a premature decolorization of the preparations.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following examples, all temperatures are set forth uncorrected in degrees Celsius; unless otherwise indicated, all parts and percentages are by weight.

In the following Examples, which are given for the purpose of illustrating the present invention, for the coating of the starting pigments with aluminum hydroxide, there are used the following aluminum salt solutions:

Solution I is prepared by dissolving 800 g of aluminum trichloride hexahydrate in 30 liters of water, heating the solution to 80° C., and adding dropwise a solution of 266 g of sodium hydroxide in 3 liters of water, the lye being added so slowly that the precipitate formed upon the dropping-in always goes into solution again and a solution is obtained which formally contains $Al(OH)_2Cl$.

Solution II is prepared analogously from 4.8 g of aluminum trichloride hexahydrate in 100 ml of water and 1.6 g of sodium hydroxide in 100 ml of water.

The polyvinyl alcohol used has an average molecular weight of about 72,000 and a degree of saponification of 98%.

As a measure of the molecular weight of the polyacrylic acid, there can be used the run-out time of a 30% solution according to DIN 53 211 (DIN=German Industrial Standard). For the preparation employed in the Examples, the run-out time, when using run-out beaker 4 according to DIN 53 211, was about 20 to 70 sec at 20° C.

EXAMPLE 1

100 g of polyvinyl alcohol is dissolved in 150 liters of an aqueous suspension of 5 kg of a titanium dioxide mica pigment with a silvery gloss (platelet size 10–60 μm; $TiO_2$ content 29%), heated to 70° C. A pH value of 5.5 is achieved by the addition of dilute hydrochloric acid. Aluminum salt Solution I is slowly added dropwise, the pH value being kept at 5.5 to 6 by the simultaneous addition of ammonia. The precipitated aluminum hydroxide layer has a polyvinyl alcohol content of about 9% by weight.

The suspension is then mixed with a solution of 66 g of azorubin [2-(4-sulpho-1-naphthylazo)-1-naphthol-4-sulphonic acid disodium salt] in 20 liters of water and adjusted to a pH of 4.0 with dilute hydrochloric acid. After about 30 minutes, the colored product is filtered off, washed with water and acetone, and dried at about 120° C.

The pigment obtained has a silvery gloss and a red powder color.

EXAMPLE 2

2.0 g of the ammonium salt of polyacrylic acid is added to 2 liters of an aqueous suspension of 30 g of a titanium dioxide mica pigment with a blue interference color (platelet size 10–60 μm; $TiO_2$ content 50%), heated to 70° C. A pH value of 6 is adjusted. Then at a pH of 5.5 to 6, aluminum salt Solution II is added dropwise. The content of polyacrylic acid in the aluminum hydroxide layer obtained is about 50% by weight.

The product so obtained is mixed with a solution of 0.4 g of azorubin in 100 ml of water and adjusted to a pH of 4.5 with dilute hydrochloric acid. After about 30 minutes, the colored pigment is filtered off, washed with water and dried at about 120° C.

The pigment obtained has a blue interference color and a red powder color.

EXAMPLE 3

Analogously to Example 1, 5 kg of the titanium dioxide mica pigment of Example 2 is coated with aluminum hydroxide in the presence of 100 g of polyvinyl alcohol. The content of polyvinyl alcohol in the aluminum hydroxide layer is about 10% by weight.

The product is colored with 66 g of azorubin in a manner analogous to that described in Example 1.

The pigment obtained has a blue interference color and a red powder color.

EXAMPLE 4

Analogously to Example 2, 30 g of the titanium dioxide mica pigment is coated with aluminum hydroxide in the presence of 5 g of polyvinyl alcohol, the product obtained containing about 12% by weight of polyvinyl alcohol in the aluminum hydroxide layer.

Coloration with azorubin analogously to Example 2 gives a pigment which has a blue interference color and a red powder color.

EXAMPLE 5

Analogously to Example 2, 30 g of the titanium dioxide mica pigment is coated with aluminum hydroxide in the presence of 5 g of sorbitol and colored with azorubin, a pigment being obtained with a blue interference color and a red powder color.

EXAMPLE 6

Analogously to Example 2, 30 g of the titanium dioxide mica pigment is coated with aluminum hydroxide in the presence of 1 g of the ammonium salt of polyacrylic acid, a polyacrylic acid content of about 30% by weight being obtained in the layer, followed by coloring with azorubin. The pigment obtained has a blue interference color and a red powder color.

EXAMPLE 7

Analogously to Example 2, but at a pH of 8.0, 30 g of the titanium dioxide mica pigment is coated with aluminum hydroxide in the presence of 0.15 g of sodium oleate and colored with azorubin at a pH of 4.5, a pigment being obtained with a blue interference color and a red powder color.

EXAMPLE 8

Analogously to Example 2 but at pH 7.5 to 8.0, 30 g of the titanium dioxide mica pigment is coated with aluminum hydroxide in the presence of 0.75 g of sodium oleate and colored with azorubin at a pH of 4.5, a pigment being obtained with a blue interference color and a red powder color.

EXAMPLE 9

Analogously to Example 2, 30 g of the titanium dioxide mica pigment is coated with aluminum hydroxide in the presence of 6 g of polyvinyl alcohol, a content of about 12% by weight of polyvinyl alcohol being obtained in the layer. After filtering off and washing, the product is suspended in 2 liters of water which is buffered with ammonia/ammonium chloride to a pH of 6, heated to 70° C., and mixed with a solution of 0.8 g of carminic acid in 100 ml of 0.2 N aqueous sodium hydroxide solution. After about 30 minutes, the colored product is filtered off, washed with water and acetone, and dried at about 70° C. The pigment obtained has a blue interference color and a red powder color.

EXAMPLE 10

Analogously to Example 2 but at a pH of 7.5 to 8, 30 g of the titanium dioxide mica pigment is coated with aluminum hydroxide in the presence of 6.0 g of the sodium salt of polyacrylic acid and colored with carminic acid analogously to Example 9, a pigment being obtained with a blue interference color and a red powder color.

EXAMPLE 11

Analogously to Example 1, 5 kg of a titanium dioxide mica pigment with a green interference color (platelet size about 10–60 μm; $TiO_2$ content 44%) is coated with aluminum hydroxide in the presence of 100 g of polyvinyl alcohol, a content of about 9% by weight of polyvinyl alcohol being obtained in the layer. Coloring analogously to Example 1 with azorubin gives a pigment which has a green interference color and a red powder color.

EXAMPLE 12

Analogously to Example 2, 30 g of the titanium dioxide mica pigment of Example 11 is coated with aluminum hydroxide in the presence of 6 g of polyvinyl alcohol, a content of about 12% by weight of polyvinyl alcohol being obtained in the layer.

The suspension is mixed with a solution of 0.4 g of acilan true green 10 G (diethyl-disulphobenzyl-di-4-amino-2-chloro-di-2-methylfuchsonimonium salt) in 100 ml of water and adjusted to a pH of 4.5 with dilute hydrochloric acid. After about 30 minutes, the colored product is filtered off, washed with water and acetone, and dried at about 120° C.

A pigment is obtained with a green interference color and a green powder color.

EXAMPLE 13

Analogously to Example 2, 30 g of titanium dioxide mica pigment of Example 11 is coated with aluminum hydroxide in the presence of 2 g of the ammonium salt of polyacrylic acid, a content of about 50% by weight of polyacrylic acid thereby being obtained in the layer.

Coloration analogously to Example 12 with 0.5 g of acilan true green 10 G gives a pigment with a green interference color and a green powder color.

EXAMPLE 14

Analogously to Example 2, 30 g of titanium dioxide mica pigment with a red-blue interference color (platelet size 10–60 μm; $TiO_2$ content 47%) is coated with aluminum hydroxide in the presence of 6 g of polyvinyl alcohol, a content of about 12% by weight of polyvinyl alcohol thereby being obtained in the layer.

Coloration with 0.4 g of brilliant black BN (7-[4′-(4″-sulpho-1″-phenylazo)-7′-sulpho-1′-naphthylazo]-1-hydroxy-8-acetylaminonaphthalene-3,5-disulphonic acid tetrasodium salt) at a pH of 4.5 gives a pigment with a violet interference color and a black-violet powder color.

EXAMPLE 15

Analogously to Example 1, 5 kg of a titanium dioxide mica pigment with a red interference color (platelet size 10–60 μm; $TiO_2$ content 45%) is coated in the presence of 100 g of polyvinyl alcohol, a content of about 9% by weight of polyvinyl alcohol thereby being obtained in the layer.

By coloration analogously to Example 1 with 66 g of azorubin, a pigment is obtained with a red interference color and a red powder color.

EXAMPLE 16

| Compact Powder | wt % |
| --- | --- |
| Pigment according to Example 12 | 30.0 |
| Talc, very fine | 52.5 |
| Magnesium stearate | 1.0 |
| Potato starch | 5.0 |
| Isopropyl stearate | 7.0 |
| Spermaceti | 1.0 |
| Ester from branched fatty acids and saturated fatty alcohols | 3.0 |
| Perfume | 0.4 |
| 4-Hydroxybenzoic acid propyl ester | 0.1 |

EXAMPLE 17

| Foam Bath | wt % |
| --- | --- |
| Pigment according to Example 1 | 0.1 |
| "Aerosil" 200 (very finely divided silica gel) at 10% paste | 10.0 |
| Dyestuff [2-(6-sulpho-2,4-xylylazo)-1-naphthol-5-sulphonic acid disodium salt] | 0.04 |
| Perfume | 1.5 |
| Citric acid | 1.0 |
| Sodium lauryl ether sulphate | 15.0 |
| Fatty alcohol ether sulphate | 60.0 |
| Coconut fatty acid diethanolamide | 4.0 |
| Water | 8.36 |

EXAMPLE 18

| Eyelid Shadow Compact Powder | wt % |
| --- | --- |
| Pigment according to Example 11 | 20.0 |
| Talc | 52.0 |
| Maize starch | 13.0 |
| Calcium stearate | 2.5 |
| Isopropyl myristate | 4.0 |
| Lanolin | 8.0 |
| Propyl p-hydroxybenzoate | 0.1 |
| Perfume | 0.4 |

EXAMPLE 19

| Lipstick | wt % |
| --- | --- |
| Pigment according to Example 15 | 10.0 |
| Castor oil | 15.0 |
| Perfume | 0.5 |
| Lipstick base mass | 74.5 |
| Lipstick base mass | |
| Bee's wax | 12.5 |
| Carnauba wax | 7.5 |
| Lanolin | 5.0 |
| Isopropyl myristate | 8.0 |
| Paraffin, viscous | 3.0 |
| Castor oil | 63.85 |
| Propyl p-hydroxybenzoate | 0.1 |
| Butylhydroxytoluene | 0.05 |

EXAMPLE 20

| Liquid Eyelid Shadow | wt % |
| --- | --- |
| Pigment according to Example 13 | 15.0 |
| Methyl cellulose (low viscous) | 20.0 |

-continued

| Liquid Eyelid Shadow | wt % |
|---|---|
| Xanthan gum | 40.0 |
| Polyethylene glycol 600 | 10.0 |
| Emulsion | 15.0 |
| Emulsion | |
| Cetyl alcohol | 12.0 |
| Oleyl alcohol polyglycol ether | 8.0 |
| Methyl p-hydroxybenzoate | 0.25 |
| Water | 79.75 |

EXAMPLE 21

| Mascara Cream | wt % |
|---|---|
| Pigment according to Example 14 | 10.0 |
| Pigment black (magnetite) | 4.0 |
| Stearic acid | 9.0 |
| Isopropyl myristate | 4.25 |
| Spermaceti | 3.12 |
| Sorbitol oleate | 0.81 |
| Sorbitol oleate, ethoxylated | 0.81 |
| Propyl p-hydroxybenzoate | 0.1 |
| Thickening agent based on silivate | 13.5 |
| Propane-1,2-diol | 9.0 |
| Triethanolamine | 4.8 |
| Methyl-p-hydroxybenzoate | 0.2 |
| Water to 100% | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A colored material-containing pearlescent pigment comprising mica flakes coated with a metal oxide, the colored material being a colored aluminum lake which is fixed as a water-insoluble compound on the surface of the pigment particles, the lake being formed by a precipitated aluminum hydroxide layer, wherein the aluminum hydroxide layer forming the colored lake contains an amount in the range of 1 to 50% by weight, sufficient to increase the light fastness of said pigment, of a compound of the formula

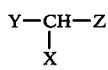

wherein X is hydroxy or carboxy; Y is hyrdrogen, or alkyl or alkenyl of 10 to 20 carbon atoms; and Z is hydrogen, alkyl or alkenyl of 10 to 20 carbon atoms, or the grouping

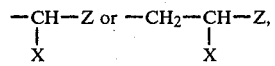

the compound having a molecular weight of at least 150 and a solubility in water at a pH of 5-9 of at least 0.05 g/l, and the compound being precipitated onto the metal oxide coated mica flakes together with the aluminum hydroxide layer.

2. A pigment of claim 1 wherein the light fastness increasing compound is sorbitol, oleic acid, stearic acid, palmitic acid, linolic acid, polyvinyl alcohol or polyacrylic acid.

3. A pigment of claim 1 containing 5-30% by weight of the light fastness increasing compound.

4. A pigment of claim 1 wherein the aluminum hydroxide layer contains 3 to 20% by weight of polyvinyl alcohol.

5. A pigment of claim 1 or 4, wherein the ratio of the number of groups X originating from the compound of said formula, to the number of molecules of Al(OH)$_3$ in the aluminum hydroxide layer is 1:2 to 1:10.

6. A process for producing the colored material-containing pearlescent pigment of claim 1 comprising precipitating an aluminum hydroxide layer onto mica flakes coated with metal oxide, and subsequently or simultaneously reacting the flakes with a solution of an hydroxy group-containing compound which, directly or with the intermediate formation of a sparingly soluble aluminum chelate followed by subsequent reaction thereof with a diazotized amine, is able to form a water-insoluble colored aluminum lake, wherein the precipitation of the aluminum hydroxide layer forming the colored lake takes place in the presence of such an amount of a compound of the formula recited in claim 1 that this compound is incorporated into the aluminum hydroxide layer in an amount of from 1 to 50% by weight, referred to Al(OH)$_3$.

7. A colored material-containing pearlescent pigment, produced by the process of claim 6.

8. A colored composition containing an amount of the pigment of claim 1 sufficient to alter the appearance of the composition, and a base ingredient which is different from said pigment.

9. A cosmetic composition containing an amount of the pigment of claim 1 sufficient to alter the appearance of the composition and a cosmetically acceptable carrier.

* * * * *